Patented May 7, 1929.

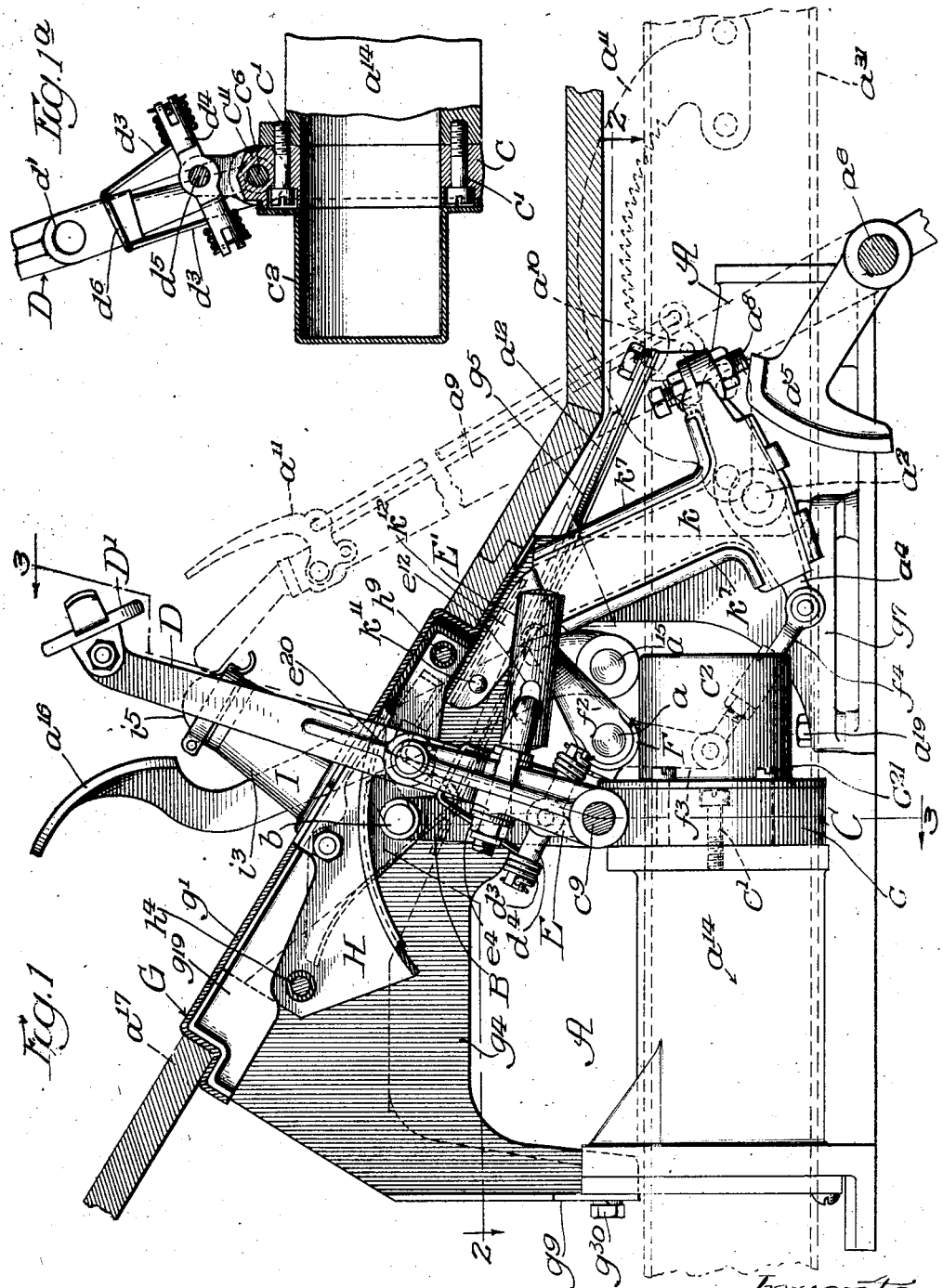

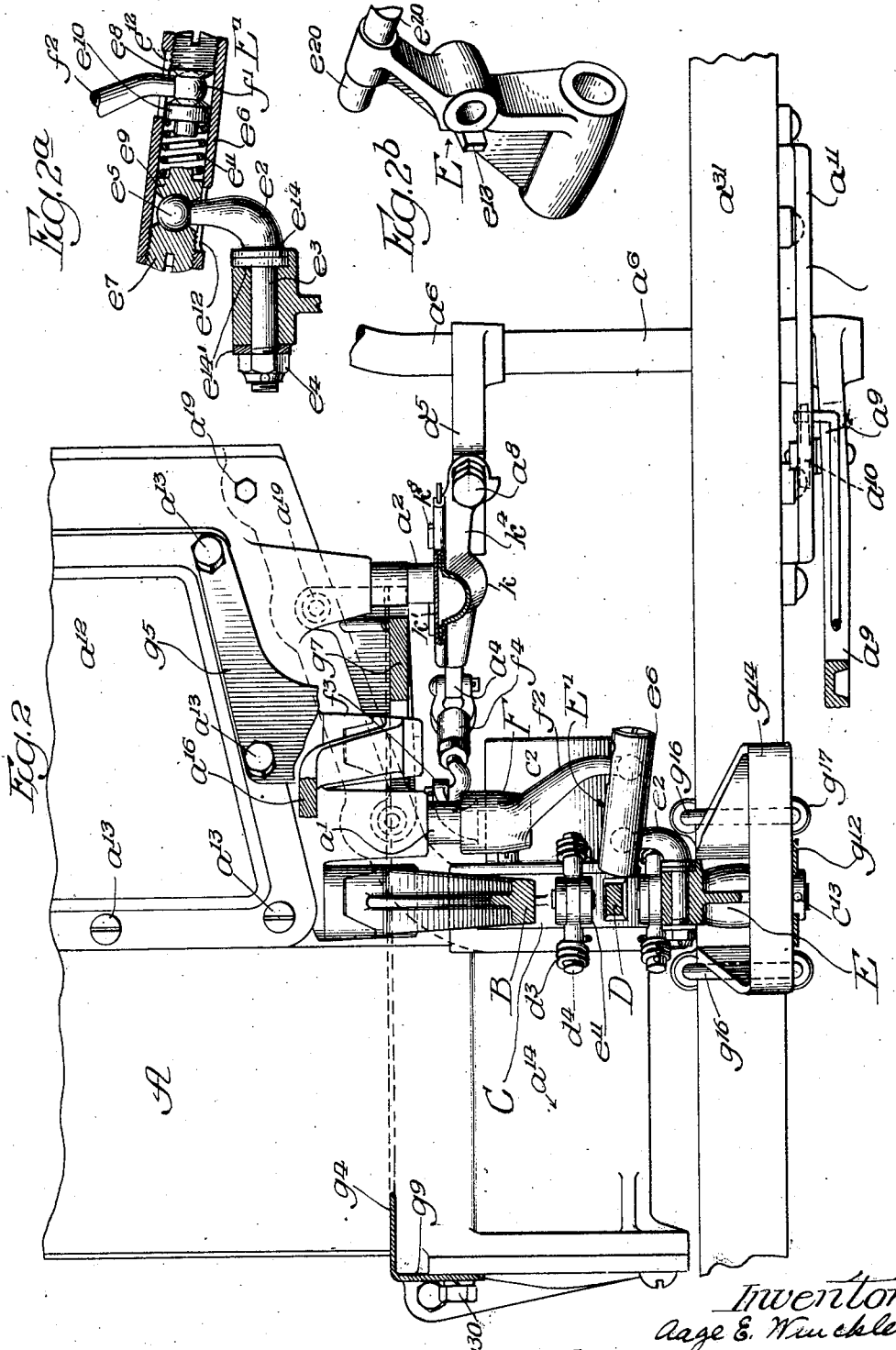

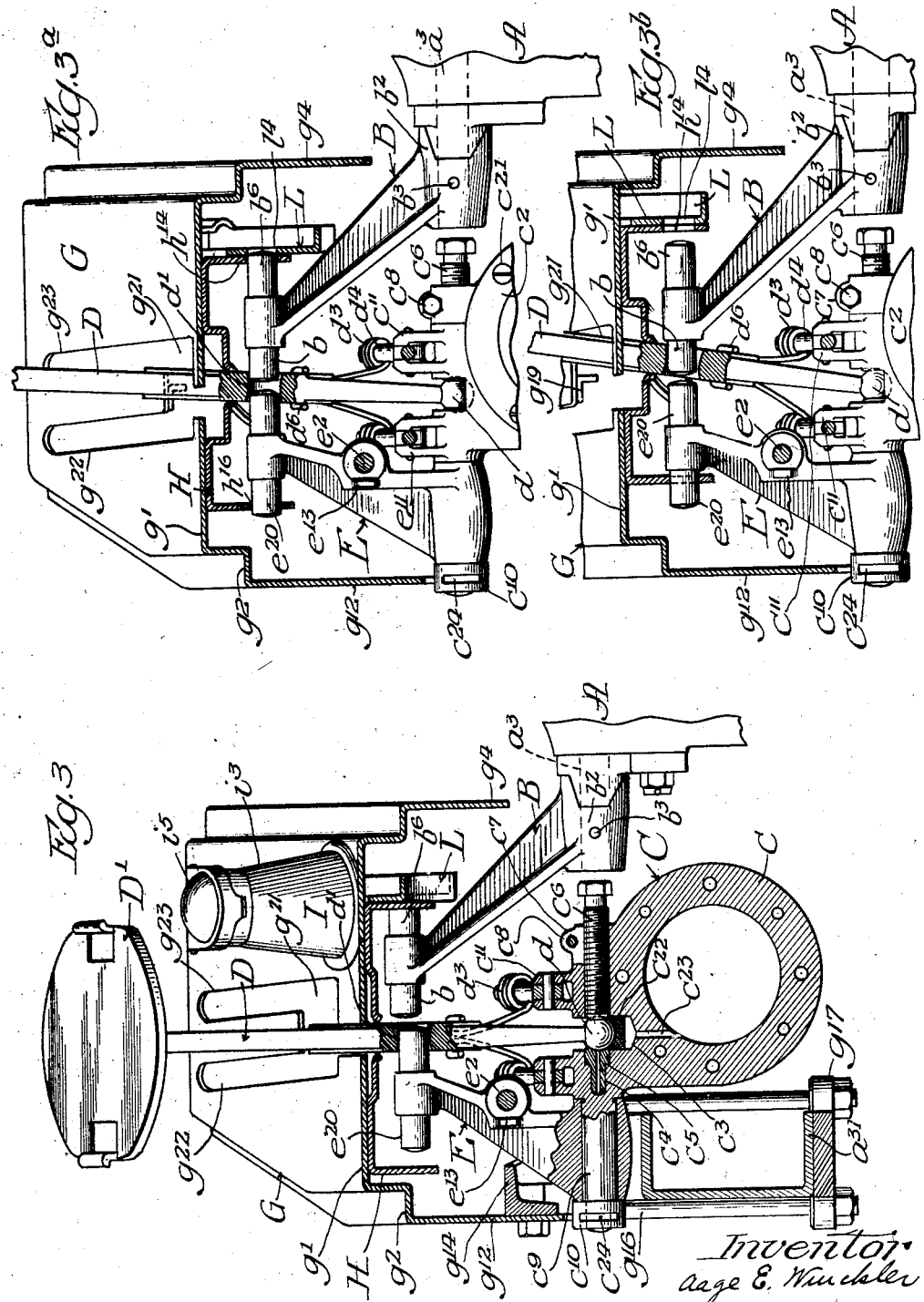

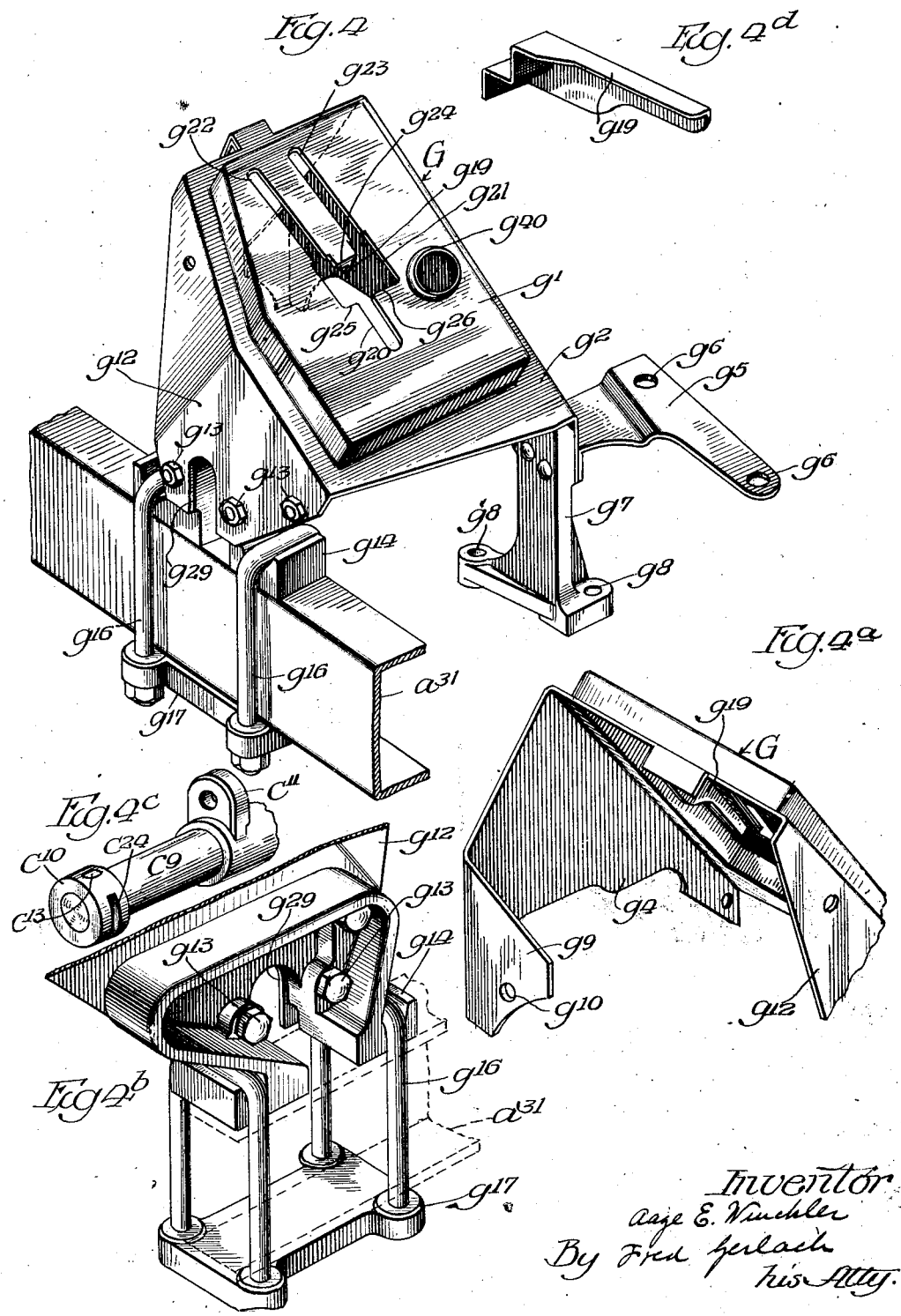

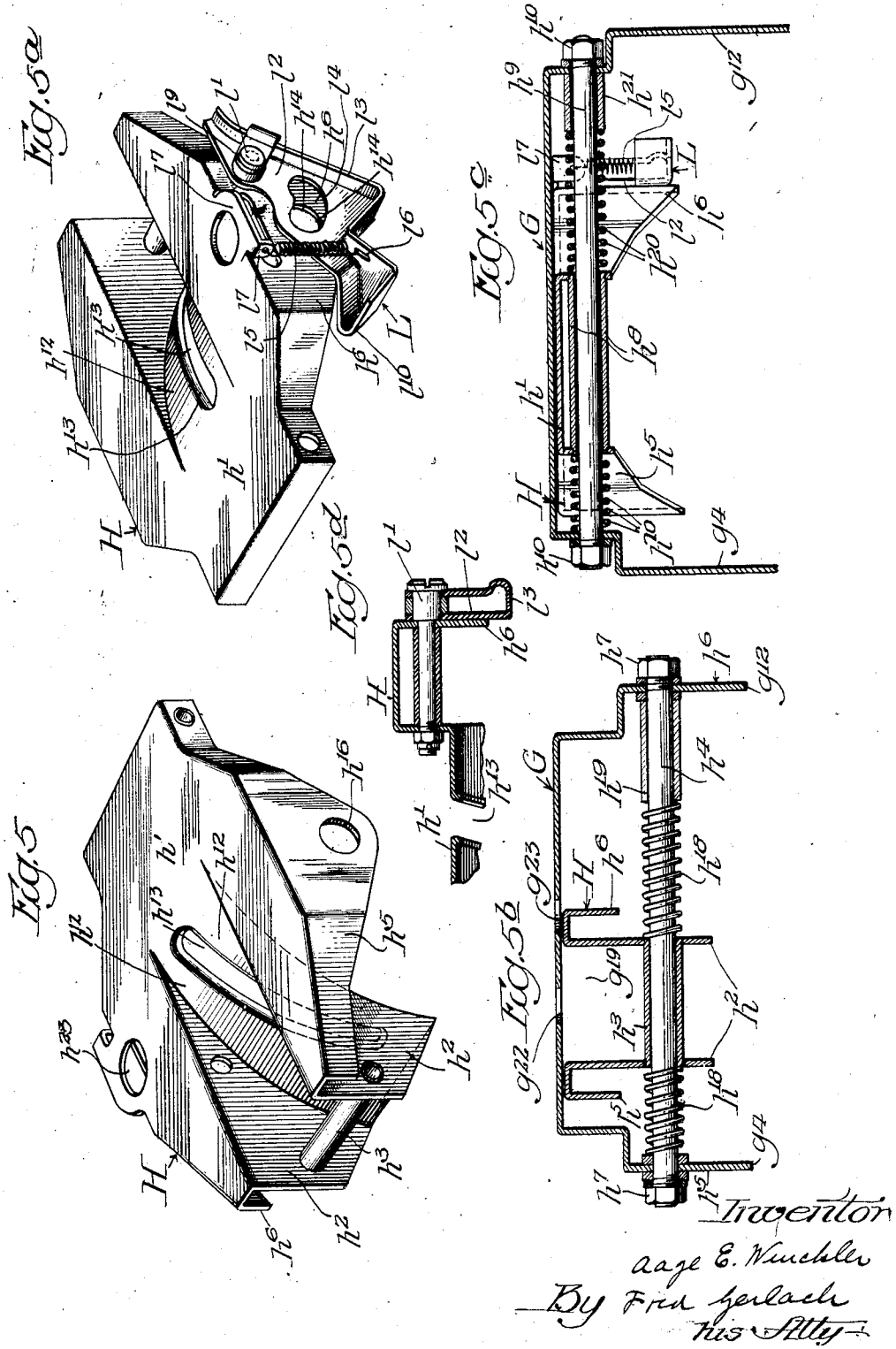

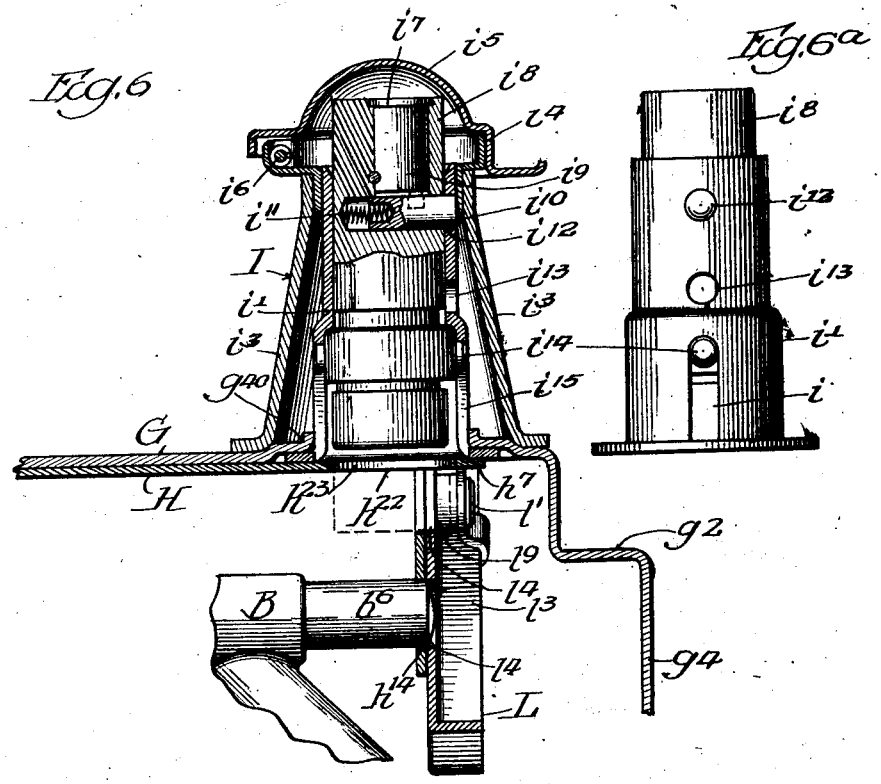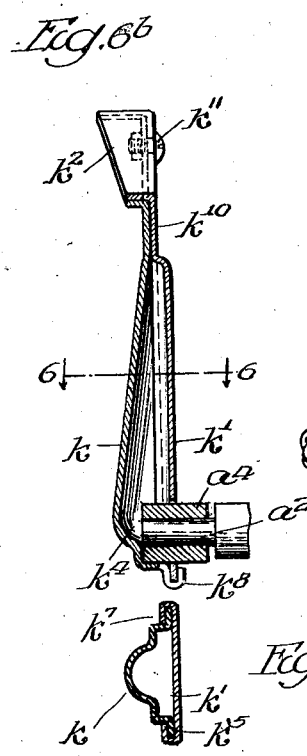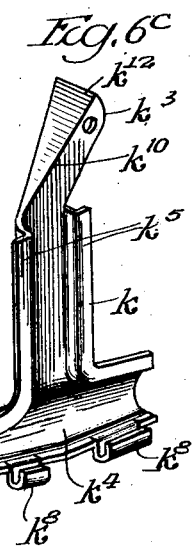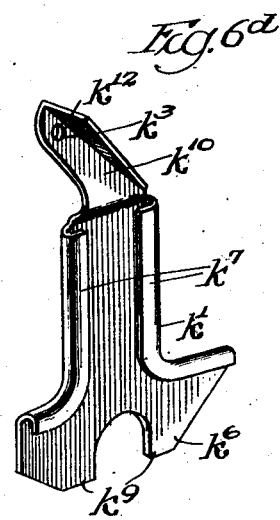

1,711,868

UNITED STATES PATENT OFFICE.

AAGE E. WINCKLER, OF MILWAUKEE, WISCONSIN.

CONTROLLER FOR TRANSMISSIONS.

Application filed August 13, 1925. Serial No. 49,922.

The invention relates to controlling devices for variable speed and reverse transmissions for vehicles.

In variable speed and reverse transmissions of the type exemplified by those used on "Ford" automobiles, a pedal is used to operate the forward drive controller-shafts, and a separate pedal is used to operate the reverse controller shaft. The pedal, used to conjointly control the low and high speed controller shafts, serves, when in an indefinitely defined intermediate or neutral position, to render the gearing inoperative or as a clutch-pedal. The absence of any positive stops for the neutral position of this pedal, and, in driving, the necessity at times of holding this pedal in its neutral position by one foot of the operator, render the control uncertain and dangerous, because any unintentional or accidental shift of the pedal forwardly or rearwardly of its neutral point may result in unintentionally rendering the low speed or high speed gearing operative.

In said transmissions, the use of separate pedals for the forward and reverse speeds, makes it necessary at times, when the reverse gearing is to be used, to use one foot to shift and hold the forward control pedal in its neutral position and the other foot to operate and hold the reverse pedal, thus leaving no foot available for the foot-operable brake. This makes it necessary at such times to depend on the hand-brake. If the latter is used to hold the clutch-pedal in its central position, it becomes necessary to release it before the high speed controller-shaft can be operated. This two-pedal control, at best, is rather complicated or difficult in its operation, and sometimes leads to confusion in emergencies and in the stalling of the motor at critical moments, especially with inexperienced drivers.

One object of the invention is to provide an improved control for transmissions of the aforesaid type, by which all of the forward and reverse controller shafts are controlled by a single pedal, so that the difficulties and disadvantages inhering in the two-pedal control will be eliminated. This object is attained primarily by providing a construction in which a single pedal is adapted, through selector levers, to be operatively connected to the reverse or low and high speed controller shafts, and in which the pedal, selector levers and coacting parts are supported outside of the transmission-casing.

Another object of the invention is to provide a one-pedal control for the aforesaid type of transmission which is adapted to be substituted for the two-pedal controls now in use without mechanical change in the transmission or vehicle construction and in the limited space available. This object is attained by providing a supporting structure for the controller pedal and its coacting parts, which is adapted to be attached to the outside of the transmission casing and the frame of such vehicles.

Another object of the invention is to provide an improved control for the aforesaid type of transmission, in which the neutral position of the controller pedal between its low and high speed positions will be clearly and positively defined by abutments to eliminate the necessity of the operator developing a sense of touch to so position the pedal and to eliminate the danger and disadvantages of indefinitely defined movements of the pedal. By making provision for positively locating or arresting the pedal in its neutral position, the confusion and unintensional or accidental shift thereof will be eliminated. This object is attained primarily by providing a control in which transverse movement of the pedal is necessary between its different positions, and by providing positive abutments in the path of the pedal, so the operator will definitely know when the lever reaches and is in its neutral position.

Another object of the invention is to provide a one-pedal control of the aforesaid type in which provision is made for positively locking the selectors when they are not connected to the controller pedal to prevent them from being accidentally shifted, and by which the pedal may be locked to prevent all of the gearings from being operated and theft of the vehicle.

Other objects of the invention will appear from the detail description.

The invention consists in the severals novel features hereinafter set forth and more particularly defined by claims at the conclusion hereof.

In the drawings: Fig. 1 is a vertical longitudinal section, parts being shown in elevation, of mechanism embodying the invention, the controller pedal being shown in position for high speed driving. Fig. 1ª is a vertical longitudinal section through the pedal carrier ring, showing the manner in which it is attached to the transmission casing. Fig. 2 is a horizontal section taken on line 2—2 of Fig. 1. Fig. 2$^a$ is a detail section of the yielding connection for operating the lever on the low speed controller shaft from one of the selectors. Fig. 2$^b$ is a detail perspective of said selector lever. Fig. 3 is a vertical section on line 3—3 of Fig. 1. Fig. 3$^a$ is a similar view, showing both the forward and reverse selector levers locked. Fig. 3$^b$ is a similar view, showing the reverse pedal transversely tilted into operative connection with the reverse selector lever. Fig. 4 is a perspective of the gate-plate and the parts for attaching it to and supporting it from the vehicle. Fig. 4$^a$ is a detail perspective of the front portion of said plate. Fig. 4$^b$ is a perspective of the block attached to the gate-plate and the devices for securing it to one of the side sills of the vehicle frame. Fig. 4$^c$ is a perspective, showing the collar on the pedal carrier, which is adapted to interfit with a depending flange of the gate-plate to correctly position the left-hand side of the gate-plate relatively to the pedal carrier. Fig. 4$^d$ is a perspective of the gusset secured to the underside of the gate-plate to reinforce the slotted portion of the plate. Figs. 5 and 5$^a$ are perspectives viewed from opposite sides respectively of the selector locking plate. Fig. 5$^b$ is a transverse section of the gate-plate and locking plate, showing the front guide for the locking plate. Fig. 5$^c$ is a similar view, showing the rear guide for the locking plate. Fig. 5$^d$ is a section, showing the pivot for the latch for locking the high speed lever against operation. Fig. 6 is a section, showing the key-controlled lock for securing the locking plate and latch to prevent the transmission from being rendered operative. Fig. 6$^a$ is a detail of the guide-sleeve for the key-controlled locking bolt. Fig. 6$^b$ is a vertical section of the extension adapted to be attached to the high speed controller lever to prevent its operation. Figs. 6$^c$ and 6$^d$ are perspectives of the sections of said extension. Fig. 6$^e$ is a section on line 6$^e$—6$^e$— of Fig. 6$^b$.

The invention is exemplified in connection with, and for attachment to, a vehicle provided with variable and reverse speed transmission enclosed in a case A, such as is used on "Ford" automobiles. This transmission comprises a transverse horizontal rock shaft $a'$, which is adapted to control the low speed gearing and is extended to project from one side of the casing A; a transverse rock-shaft $a^2$, which is adapted to control the high speed drive and has secured thereto on the outside of the casing, a lever $a^4$; a transverse shaft $a^3$, which controls the reverse gearing; a cam $a^5$ fixed to the hand-brake shaft $a^6$ and adapted to engage a screw $a^8$ on lever $a^4$ to operate the high speed and low speed controller shafts into and hold them in their neutral positions; and a hand-brake lever $a^9$ for operating shaft $a^6$ is adapted to be locked by a finger-controlled latch $a^{10}$ and a rack $a^{11}$. The transmission case is formed of upper and lower sections secured together by bolts $a^{19}$, and is provided with the usual removable top-cover-plate $a^{12}$ which is secured thereto by bolts $a^{13}$ and with a boss $a^{14}$ integrally formed with the upper section of the transmission casing, for the starter mechanism. A foot-controlled brake is included in the transmission-casing and is controlled by a shaft $a^{15}$ and a pedal $a^{16}$, as well understood in the art. The construction and operation of these parts are well known, so that a more detail description is not deemed necessary.

The improved controlling mechanism comprises a pedal comprising a lever D with a foot-piece D' at its upper end, which is adapted, through selective operation, to control the low, high and reverse controller shafts. For the purpose of providing a structure which is adapted to be applied to vehicles in use, without mechanical change in the transmission or vehicle structure, a pedal carrier C is formed to fit against and to be secured to the boss $a^{14}$ of the transmission-casing, in lieu of the cover for the starting pinion or the rear-cover-plate secured to the rear face of said boss. This carrier comprises a ring $c$, which fits against the rear face of said boss and is secured by screws $c'$ which have heads which are countersunk in the ring and are adapted to enter the sockets for the screws used for the cover or cover-plate, which is removed from the transmission when the invention is to be applied. A flanged cap $c^2$ is fitted to the rear face of the carrier ring $c$ to enclose the starter device and is secured thereto by screws $c^{21}$. This carrier serves to pivotally support the controller pedal D and as a support for a selector lever or arm E. The lower end of lever D is pivoted for universal movement to permit the pedal to be shifted transversely and longitudinally of the vehicle in controlling the transmission. A ball $d$, integral with the lower end of said lever, extends into a recess $c^3$ formed in the top of the carrier ring $c$ and is pivotally confined between a transversely extending stepped insert plug $c^4$, which fits in a correspondingly shaped socket $c^5$ in the carrier, and an oppositely arranged screw $c^6$, which is threaded to the carrier. The inner end faces of plug $c^4$ and screw $c^6$ are spherically concaved to fit the ball $d$ on lever D. The carrier is transversely split, as at $c^7$, and threaded for a bolt $c^8$, which is adapted to clamp screw $c^6$ and securely fix it in its adjusted position. The carrier-ring $c$ is formed with a duct $c^{23}$, which leads from the inside of the ring $c$, to receive splashed lubricant from the transmission case and deliver it to the recess $c^3$ and to a packing $c^{22}$ which bears against the ball $d$ to automatically keep the lever-pivot well lubricated.

This exemplifies a pedal carrier, adapted to be mounted on the transmission case and which is provided with means for keeping the pedal-pivot lubricated. Lever D is provided with a transverse hole $d'$, which is adapted to receive an inwardly extending stud $e'$ on the selector E, to operate the low and high speed control shafts when the lever is shifted longitudinally, or to receive a transverse stud $b$ on a reverse selector lever or arm B to operate the reverse control shaft $a^3$ by longitudinal movement of the lever D, or to simultaneously receive both of the studs for locking purposes. For this purpose, pivot-stud $c^9$ for the selector lever E and the axis of the pivot for lever D are coaxial with the reverse control shaft $a^3$, and the carrier C is designed to make them so in the limited space available. The lever D is normally and yieldingly held in a transversely vertical position or centralized by a pair of springs $d^3$. Each of said springs has a coil at either end which has one of its terminals fixed in one end of a lever $d^4$, which is centrally pivoted on a pin $d^5$ held in vertically extending lugs $c^{11}$ on the top of the carrier C. The intermediate portions $d^6$ of each spring are looped to bear against the sides of the pedal respectively, to exert opposing force upon the lever D, so that it may, when released, assume a transversely vertical position and swing backwardly into high speed position. Levers $d^4$, which carry the springs $d^3$, are pivoted to swing so that said springs may swing longitudinally with the lever D.

Selector E is pivoted to swing longitudinally of the vehicle, on stud $c^9$, which is integral with the pedal carrier C, and extends laterally outward from one side thereof, so that the carrier, when attached to the transmission-case, will serve also as an attachable support for said selector. A collar $c^{10}$, secured to the outer end of stud $c^9$ by a key-pin $c^{13}$, holds said selector on said stud. Selector lever or arm B is provided with a hub $b^2$, which is adapted to be substituted for the separately operable reverse pedal removed from the projecting end of the reverse controller shaft $a^3$, and is fixed to said shaft by a pin $b^3$. This exemplifies a reverse selector which is adapted to be substituted for a reverse pedal on the transmissions heretofore used on "Ford" automobiles. By making selectors E and B coaxial, they are both engageable with the lever D by transverse movement of the lever, and operable to rock the controller shafts by longitudinal or fore-and-after swinging of the lever.

A lever F has a hub formed to be fit on the projecting end of the low speed controller shaft and is substituted for the clutch-pedal used in a two-pedal control, and comprises integral arms $f^2$ and $f^3$. Said lever is connected to be operated by the selector E, is adapted to operate the low speed controller shaft $a'$ and is connected to operate the high-speed controller shaft $a^2$. A resilient connection E' is provided to operate lever F from selector E. This connection comprises (Fig. 2$^a$) an arm $e^2$ which has a stud $e^3$ which extends through said lever and is secured therein by a nut $e^4$; a ball $e^5$, integral with the distal end of arm $e^2$ which is curved rearwardly and transversely inwardly from selector E; a sleeve $e^6$; a plug $e^7$, which is screw-threaded to the inside of the front end of sleeve $e^6$ and has a concave seat for ball $e^5$; a ball $f'$, integral with an arm $f^2$ of lever F, held in a concave seat in a plug $e^8$ which is screw-threaded to the inside of the other end of connector-sleeve $e^6$; a plug $e^9$, slidably confined in sleeve $e^6$, with a concave seat to engage ball $e^5$; a plug $e^{10}$, also slidably confined in sleeve $e^6$ with a concave seat to engage ball $f'$; and a spring $e^{11}$ interposed between plugs $e^9$ and $e^{10}$ to hold them in engagement with the balls respectively. This forms a yielding connection between the selector E and lever F, to permit the interengaging members of the transmission to mesh at the proper time. The sides of the sleeve $e^6$ are slotted, as at $e^{12}$, to permit the balls to be inserted, and relative longitudinal movement between the sleeve and the balls when the spring yields on account of resistance in the gearing.

Arm $f^3$ is pivotally connected to the front end of an adjustable link $f^4$, which is connected to operate the lever $a^4$ on the high speed controller shaft $a^2$, so that when the pedal is shifted rearwardly of its neutral position and is in engagement with the selector E, said shaft will be operated to render the high speed drive operative. This link is the same as that which is connected to an arm on the clutch pedal in a two-pedal control.

Arm $e^2$ is provided with a flat surface $e^{14}$ (Figs. 3 and 2$^a$) which is engaged by an abutment lug $e^{13}$ (Fig. 2$^a$) integral with selector E, to secure the arm against rotation in said selector. Spacing washers $e^{14'}$ fit around the stud $e^3$ (Fig. 2$^a$), and by transposition of both of these to either end of stud $e^3$ the selector may be truly positioned to be engaged by the pedal lever when the latter is in its neutral position. This adapts the connection, operated by the selector, to compensate for variations in the connection between the lever F and the high speed controller shaft $a^2$.

A gate-plate G (Figs. 1 and 4), preferably formed of sheet metal, is adapted to be inserted in the inclined floor $a^{17}$ of the vehicle in front of the driver's seat, and is adapted to be supported from the transmission case and vehicle frame without alteration in said casing or frame. This plate is adapted to guide the controller lever D in its transverse and longitudinal controlling movements and to support a device for locking the selectors, and comprises a top-member $g'$ which is adapted to close an opening cut in floor $a^{17}$, and a depressed marginal ledge $g^2$ adapted to underlie and support the contiguous ends of the floor boards, and a downwardly extending inner side $g^4$, to which is secured a sheet metal brace $g^5$, which is extended to overlie a portion of the margin of the transmission-case cover $a^{12}$ (Fig. 2), and is provided with holes $g^6$ which register with two of the bolts $a^{13}$ by which said cover is secured in place, so the sockets for the cover-retaining screws may be utilized in supporting the plate G. A standard-bracket $g^7$ is also fixed to the rear end of the plate side $g^4$, and this is provided with holes $g^8$ which register with holes for two of the bolts $a^{19}$, which are used to secure the sections of the transmission-case together. The inner plate-side $g^4$ is also formed with an integral transversely extending lip $g^9$ (Fig. 4$^a$), which is adapted to extend across the front of the transmission casing, and is provided with a hole $g^{10}$ for a bolt $g^{30}$ which is substituted for one of those used to secure the usual front cover on the boss $a^{14}$ of the transmission case, so that the plate G may be attached thereto without change in the casing. Lip $g^9$ is curved, as at $g^{11}$, to fit around the front cover-plate of the transmission casing, without change in said casing or cover-plate. Plate G is also provided with a depending outer side $g^{12}$, which is secured, as by screws $g^{13}$, to a block $g^{14}$ which fits on the top of the left-hand sill $a^{31}$ of the vehicle frame, by means of U-bolts $g^{16}$ which fit into transverse grooves $g^{15}$ in block $g^{14}$ (Fig. 4$^b$), and are extended through a bottom-plate $g^{17}$ to clamp the block to the sill. To correctly position the outer side of plate G, it is formed with a slot $g^{29}$, the edges of which are adapted to enter vertical grooves $c^{24}$ (Fig. 4$^c$) in the sides of the collar $c^{10}$ which holds the selector lever E on its stud $c^9$. The lower end of slot $g^{29}$ is open, so that the gate-plate may, in being applied to the vehicle, be lowered to form an interfitting connection with the collar $c^{10}$, which is positioned by the carrier C which is supported by the transmission-case, and by means of this connection, the outer side of the plate and the block $g^{14}$ may be correctly positioned on the sill $a^{31}$ before the U-bolts $g^{16}$ are tightened. This construction exemplifies one for supporting the plate G.

The controller-lever D extends through the plate G, which is provided with slots (Fig. 4), so that the pedal may be operated into predetermined positions to render the low speed, high speed or the reverse gearing operative. These guide-slots comprise a transversely extending cross-slot $g^{21}$, in which lever D is movable transversely while it is in its neutral position; a longitudinal rearwardly extending slot $g^{20}$, in which the controller lever D is movable longitudinally of the vehicle rearwardly of its neutral position to render the high-speed drive operative; a longitudinally and forwardly extending slot $g^{22}$, communicating with the outer side of the front of cross-slot $g^{21}$, and to permit the controller lever to be shifted forwardly to render the low speed gearing operative; and a slot $g^{23}$, extending longitudinally and forwardly from the inner side of slot $g^{21}$, so the lever D may be shifted forwardly from its neutral position to render the reverse gearing operative. The front edge $g^{24}$ of cross-slot $g^{21}$, between slots $g^{22}$ and $g^{23}$, serves as a positive stop for said lever when it is shifted forwardly from its high speed position to the neutral, so that the operator will have a definite demarcation of movement in shifting the lever to its neutral position. The rear edge portion $g^{25}$ of cross-slot $g^{21}$ similarly serves as a positive stop for the pedal when it is shifted backwardly from its low-speed position in the front of slot $g^{22}$ to its neutral position in cross-slot $g^{21}$, so that the operator will have a definite demarcation in the movement of lever D when desiring to change from low speed to neutral. A rear edge-portion $g^{26}$ of the transverse slot $g^{21}$ similarly serves as a stop for the controller-lever when it is shifted from the position in which it renders the reverse gearing operative to neutral. This plate exemplifies one which is provided with guide-slots for the pedal between its several positions, in which positive stops are provided for it to indicate to the operator that it has reached the positions in which all of the gearings are neutral or inoperative. To stiffen the front of the gate-plate between slots $g^{22}$ and $g^{23}$, a gusset $g^{19}$ is welded or otherwise suitably secured to the underside thereof.

The invention provides for selectively shifting lever D transversely into connection with the stud $e'$ of selector E for selectively shifting the high and low-speed controller shafts and for transversely shifting it out of engagement with said selector and into engagement with the stud $b$ of the reverse selector lever B. This transverse movement is possible only when the pedal is in its neutral position in cross-slot $g^{21}$. Slot $g^{22}$ permits the pedal to be shifted forwardly to shift the selector E after the pedal has been shifted transversely to the left-hand side of said cross-slot. Slot $g^{23}$ permits lever D to be shifted forwardly after it has been shifted transversely to the right side of the cross-slot $g^{21}$, which brings the pedal into operative connection with the stud $b$ on the selector B. Slot $g^{20}$ permits the pedal to be shifted rearwardly from a transversely medial position in the cross-slot while it remains in connected relation with the stud $d'$ on the selector E, to render the high-speed drive operative.

In practice, it is necessary that the selectors should be locked against accidental movement when they are not connected to the controller lever, and for this purpose a locking plate H (Figs. 5 and 5$^a$) is mounted to slide transversely under, and is supported by, the gate-plate, and is operable transversely by the controller lever. This plate H is preferably formed of sheet-metal and comprises a top wall $h'$, contiguous to the underside of the gate-plate G; an inner side-flange $h^6$ provided with a hole $h^{14}$ to receive a locking stud $b^6$ on selector B, and an outer side flange $h^5$ with a hole $h^{16}$, to receive a locking stud $e^{20}$ on selector E; front depending flanges $h^2$ with a front spacing sleeve $h^3$ between them. This sleeve is slidable on a transverse rod $h^4$ which is fixedly secured by nuts $h^7$ in the outer side flanges $g^4$ and $g^{12}$ of the gate-plate G. A rear spacing sleeve $h^8$, between flanges $h^5$, $h^6$, is slidable on a rod which is held in flanges $g^4$ and $g^{12}$ of the plate G by nuts $h^{10}$. These rods and sleeves serve to guide the locking plate transversely when it is shifted by the controller-lever and hold the locking plate against longitudinal movement with the lever. This locking-plate has a curved wall $h^{12}$, in which is formed an arcuate slot $h^{13}$, through which lever D extends. This slot permits longitudinal movement of the lever, and when the lever is shifted transversely in the cross-slot $g^{12}$ of plate G, to bring it into connection with one of the selectors, the locking-plate will be shifted transversely to secure the other selector lever against movement. This locking-plate is also adapted, when it is held in a predetermined position in the cross-slot $g^{21}$, to secure both selectors against fore-and-aft movement (Fig. 3$^a$) when it is desired to lock the entire transmission. At such time, lever D will be locked against fore-and-aft movement between the stop edges $g^{24}$ and $g^{26}$ of cross-slot $g^{21}$.

While the controller lever is in its neutral position and aligned with slot $g^{20}$, and is being shifted backwardly to render the high-speed drive operative, and while it is in high speed position (Fig. 3), the lever D will engage the left-hand side of slot $h^{13}$ in plate H, so locking-stud $b^6$ on the reverse selector B will be held in hole $h^{14}$ and locked against movement. While lever D is in its neutral position at the left hand side of slot $g^{21}$ and is being shifted forwardly in slot $g^{22}$, it will also ride against the one side of slot $h^{13}$ and be held in slot $g^{22}$, so the locking-plate will lock stud $b^6$ to keep the selector B against operation when the controller is in its low speed position. When the controller lever D is shifted transversely to the right in cross-slot $g^{21}$, preparatory to rendering the reverse gearing operative, it will be disengaged from stud $e'$ of selector E, and stud $b$ of the selector B will enter the hole $d'$ in the controller lever. This transverse shift of the lever D will thus correspondingly shift the locking plate H to the right and cause stud $e'$ to enter hole $h^{16}$ in the side flange $h^5$ of the locking plate (Fig. 3$^b$), so that the selector E and its connected parts will be locked against movement while the reverse gear is being engaged and is operative. When the pedal is in the position shown in Fig. 3$^a$, it will engage both of the studs $e'$ and $b$ of the selector levers respectively, and will be locked against fore-and-aft movement to lock the connections for all speed controls, and this position is utilized in locking the gear-control to prevent its use by unauthorized persons, as hereinafter more fully set forth.

Springs $h^{18}$ around the guide-rod $h^4$ are applied to the opposite sides of the locking-plate H to normally position it at a point where the lever D will enter the slot $g^{20}$ in the gate-plate and so that the lever will automatically pass into its high speed position when it is released by the operator. A spacing sleeve $h^{19}$ is interposed between one of the springs $h^{18}$ and the side $g^{12}$ of the gate-plate. For the same purpose, springs $h^{20}$ are coiled around guide-rod $h^9$, which is fixedly held in the gate-plate. A spacing sleeve $h^{21}$ is interposed between one of the springs $h^{20}$ and the side $g^{12}$ of the gate-plate. The slots $g^{22}$ and $g^{23}$ in plate G and the slot $h^{13}$ in plate H are longitudinally inclined to permit the lever D to move laterally with shafts $a'$ and $a^3$ which are usually axially slidable as well as rotatable.

The invention contemplates utilizing the locking plate H to function with a key-operable locking device for locking the entire transmission to prevent theft of the vehicle, as well as alternately securing the selector levers in their neutral positions. For this purpose, a hole $h^{23}$ is cut in the top wall of the locking-plate for a key-controlled bolt. This bolt is positioned to enter said hole and secure the locking-plate H so lever D cannot be shifted transversely when it is locked against fore-and-aft movement between stops $g^{24}$ and $g^{26}$ in the cross-slot $g^{21}$ of the gate-plate, at which time the lever is interlocked with the stud $e'$ on selector E, and stud $b$ on the selector B (Fig. 3$^a$). The key-operable bolt is adapted to secure the locking-plate H against transverse movement, so that the lever D, when in said position, will be locked against movement in any direction, and the transmission-gearing will be neutral. This locking mechanism I comprises a cylindrical bolt $i$ which is longitudinally slidable in a cylindrical guide $i'$, which is flanged at its lower end and extends through a hole $g^{10}$ in the gate-plate G; a cylindrical housing $i^3$, which has its lower end flanged to fit against the top face of gate-plate G, and encloses the guide $i$; a member $i^4$, which is secured to the top of housing $i^3$; a cover $i^5$, which is pivoted at $i^6$ to said member; and a key-operable cylinder-lock $i^7$ of any suitable construction, which is rotatably secured in a socket $i^8$ in the upper end of bolt $i$, which is adapted, in any suitable manner, to operate a locking-stud $i^{10}$, which is pressed outwardly by a spring $i^{11}$. Stud $i^{10}$ is adapted to enter an upper hole $i^{12}$ in the guide $i'$, to hold the bolt $i$ in its inoperative position and a lower hole $i^{13}$ to lock it in its depressed or operative position. A cross-pin $i^{14}$ extends through bolt $i$ and into vertical guide-slots $i^{15}$, formed in guide $i'$, to hold the bolt against rotation. To operate this device to lock the entire transmission, the proper key is inserted in the cylinder lock $i^{7}$ and rotated to withdraw the stud $i^{10}$ from hole $i^{12}$, and thus release bolt $i$. Then the bolt $i$ is pressed downwardly until the stud $i^{10}$ enters hole $i^{13}$ in guide $i'$, and bolt $i$ passes through hole $h^{23}$ in the locking-plate H, so that said plate will be held against transverse movement to lock the lever D in that position in the cross-slot $g^{21}$ where it cannot be operated in fore-and-aft direction and will be secured against transverse movement. The housing $i^{3}$, guide $i$ and member $i^{4}$ are suitably secured together to form a unitary structure after they have been assembled with the gate-plate. These parts, as well as the cover, are consructed so they may be formed of sheet metal.

When the controlling mechanism is applied to a vehicle in which an adjustable or detachable link $f^{4}$ is used to shift the high speed controller shaft with a cam $a^{5}$, to operate the lever $a^{4}$ on said high-speed controller shaft, it would be possible to render the high speed operative by means of the hand-brake lever, shaft $a^{6}$ and cam $a^{5}$ upon disconnection of the link $f^{3}$, and to prevent this from being done while the controller lever D is locked against operation, an extension is provided which is adapted to be permanently secured around the lever $a^{4}$, to coact with a latch operable by the bolt $i$, which is provided to prevent the lever $a^{4}$ from being thus operated. The extension for lever $a^{4}$ is composed of a pair of sheet metal sections $k$, $k'$ (Figs. 6°, 6ᵈ), which are adapted to surround and enclose said lever and to be secured together by a rivet extending through holes $k^{3}$ in the sections. Section $k$ comprises a lower pocket portion $k^{4}$ which is adapted to fit under, around one side, and over the top and bottom of lever $a^{4}$, and is provided with angular marginal flanges $k^{5}$. The section $k'$ is adapted to extend across the inner side of lever $a^{4}$, is provided with a slot $k^{6}$, to straddle the high speed controller-shaft $a^{2}$, and is provided with angular hook-flanges $k^{7}$ adapted to fit around the flanges $k^{5}$ on section $k$, to form an interlocking connection between the sections. The lower portion of section $k$ is provided with grooved tongues $k^{8}$ to receive and interlock with the lower end portions $k^{9}$ of section $k'$. Sections $k$, $k'$ are each provided with an angular extension $k^{10}$, which overlaps each other when permanently secured together by a rivet $k^{11}$, which extends through holes $k^{3}$ and with transversely extending lips $k^{12}$ for engagement with a latch L (Fig. 5ᵃ). The latter is pivotally mounted on and movable transversely with the locking plate H, being connected thereto by a stud $l'$, (Fig. 5ᵈ), which is secured in the depending flanges at the right-hand side of locking plate H. This latch is formed of sheet metal, with a vertically extending wall $l^{2}$ contiguous to the outer face of side flanges $h^{6}$ of the locking plate H, and an angular flange $l^{3}$ along its lower and rear margin. It is formed with an arcuate slot $l^{4}$ to permit the locking stud $b^{6}$ on the selector lever B to pass through latch L and the latch to swing into and out of operative position while said stud is in said slot. A tension spring $l^{5}$ is hooked into a slot $l^{6}$ in flange $l^{3}$ and is connected at its upper end to an ear $l^{7}$ in an outstruck portion of the locking plate, so that the latch will be normally held in its raised or inoperative position. The upper edge of this latch is also formed, as at $l^{9}$, so as to be engaged by the lower end of bolt $i$ when said bolt is lowered into its operative position and when the lever D is locked against operation. The rear end of latch L is extended inwardly, as at $l^{10}$, to a point adjacent the lips $k^{12}$ of the lever-extension $k$ to prevent the high-speed controller lever $a^{4}$ from being operated to render the high speed gearing operative while the controller lever D is locked. This exemplifies a construction which is adapted to be applied to a car of the "Ford" type as now used, and in which provision is made for preventing the operation of the high speed controller shaft while the controller pedal is locked. When the bolt $i$ is withdrawn upwardly to release the controller pedal, spring $l^{5}$ will lift the latch L to its inoperative position and release the extension $k$, so that the high speed controller shaft may be operated, either by the lever D or by the hand-brake lever. The construction set forth also exemplifies one in which the latch and extension are formed of sheet metal units so they can be produced at a low cost.

The improved controlling mechanism is applied to a motor-driven vehicle of the "Ford" type, in the following manner: The clutch-pedal and reverse-pedal for the two-pedal controls are removed from shafts $a'$ and $a^{3}$ respectively and the usual cover for the starter or the rear cover-plate on the left-hand side of the transmission-casing A is removed. The reverse selector B is then attached by means of pin $b^{2}$ to the reverse controller shaft $a^{3}$ from which the pedal has been removed, the inner end of the hub of the selector lever being shaped similarly to the hub on the removed pedal, so that it will operate said shaft in lieu of the discarded separate pedal. The carrier C is then substituted for said cover or plate and is secured to the transmission-casing by the screws $c'$, which are adapted to enter the threaded sockets used for the cover or plate which has been removed. The flanged cap $c^2$ is then secured to the back of the carrier-ring $c$ by screws $c^{21}$ to close the rear of said ring. Next, the ball-pivot $d$ of the pedal is placed in the recess $c^3$ in the pedal-carrier and screw $c^6$ is set to hold the ball in conjunction with plug $c^4$, so that the pedal may be pivotally shifted longitudinally and transversely. The selector E is mounted on the stud $c^9$ on carrier C, being slipped onto it from the left-hand side of the vehicle, and collar $c^{10}$ is fixed to the outer end of said stud by a keypin $c^{13}$, to hold said selector. Lever F is attached to the low-speed controller-shaft $a'$ with its connections to the selector lever E, and its arm $f^2$ is connected to the link $f^3$ to operatively connect it to the high-speed controller lever $f$, which is fixed to the shaft $a^2$. Extension plates $k$, $k'$ are assembled around arms $a^4$ and secured together by rivet $k^{11}$. Two of the transmission cover screws $a^{18}$ are removed, so bracket $g^5$ may be attached to the transmission casing, and two of the screws which secure the sections of the transmission casing together are removed and passed through holes $g^8$ in bracket $g^7$. A screw is removed from the front of the transmission-casing and passed through hole $g^{10}$ in lip $g^9$ of the gate-plate, to mount the inner or left-hand side of the gate-plate on the transmission casing. The block $g^{14}$, secured to the gate-plate by screws $g^{13}$, will be positioned on the sill by the slot $g^{29}$ and collar $c^{10}$ and then be clamped on the sill by the U-bolts $g^{16}$ in its correct position, so that the gate-plate will be properly position. The gate-plate is then attached. This exemplifies a one-pedal control for high, low and reverse transmission gearing which may be quickly substituted for a two-lever control on vehicles embodying transmissions of the two-pedal control type.

The operation of the controller mechanism will be as follows: When the car is idle, the controller-pedal may be held in its neutral position by operating the hand-brake lever $a^9$ to shift cam $a^5$ so it will engage abutment screw $a^8$ to operate link $f^3$ and lever $a^4$. To start the car at low speed, assuming the pedal to be in its neutral position, the lever D is shifted transversely to the left-hand side of the cross-slot $g^{21}$, which will cause the stud $e^{20}$ of the selector lever E to enter or remain in hole $d'$ in the pedal and operate the locking plate H to lock reverse selector B, and then the lever is shifted forwardly in slot $g^{22}$. This will shift the low speed controller shaft $a'$ through selector E, arm $e^2$, yielding connection E' and arm $f^2$ of lever F, and into position to render the low speed gearing operative to propel the vehicle, and cause plate H to lock stud $b^6$ of the reverse selector lever B, so that the reverse control shaft cannot be operated while the low speed drive is operative. To drive the car at high speed, the controller-lever D is released to its neutral position, whereupon it will be shifted transversely by the pressure of springs $d^3$ applied to it, to the point in cross-slot $g^{21}$ of plate G, where it will be aligned with the high-speed slot $g^{20}$, so it will enter said slot and move backwardly therein. During this backward movement of lever D from its neutral position, it will remain connected to the selector E, which will, through selector E, arm $e^2$, connection E', lever F, link $f^4$ and arm $a^4$, cause the high speed controller shaft $a^2$ to move into position to render the high speed drive operative, as long as the lever D remains in the rear end of slot $g^{20}$. When it is desired to reverse the vehicle, the lever D is shifted from any position in which it might be, into its neutral position in the cross-slot $g^{21}$. Then, it is shifted transversely to the right-hand end of said slot which will cause it to be released from stud $e^{20}$ of the selector E and cause stud $b$ of the selector B to enter the hole $d'$ in the pedal, so that it will be interlocked therewith. Simultaneously, the selector B will be released by the locking plate and the latter will lock the selector E. Then, the operator will shift the pedal forwardly in slot $g^{23}$, which will rock the selector lever B to shift the reverse controller shaft $a^3$ and render the reverse operative.

In the manipulation of the pedal from any of its positions to neutral, the pedal will encounter an abutment to indicate to the operator that it has reached such position, and thus guess-work will be eliminated, so that the operator may definitely control the transmission. Cam $a^5$, through hand-brake lever $a^4$, latch $a^{10}$ and rack $a^{11}$ and shaft $a^6$, is adapted to shift lever $a^4$ to secure the controller lever in its neutral position.

When the key-controlled bolt $i'$ is shifted to lock the plate H, the entire transmission will be locked. The latch L will be lowered to coact with the extension $k$, $k'$ attached to lever $a^4$ to prevent the controller-shaft $a^2$ from being operated if the link $f^4$ should be removed.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. The combination with variable speed and reverse transmissions for vehicles comprising an enclosing casing, a high speed controller shaft, a low speed controller shaft, and a reverse controller shaft, the shafts being extended to the outside of the casing, a lever, means for supporting the lever on the outside of the transmission casing, a selector supported outside of said casing, engageable by and disengageable from the lever and connected to operate the high and low speed controller shafts, a reverse selector fixed on the reverse controller shaft outside of the casing, engageable by and disengageable from the lever, and a gate plate supported from and outside of the transmission casing provided with communicating slots provided with stops to arrest the lever in its neutral position when shifted thereto from its other positions.

2. The combination with variable speed and reverse transmissions for vehicles comprising an enclosing casing, a high speed controller shaft, a low speed controller shaft, and a reverse controller shaft, the shafts being extended to the outside of the casing, of a foot-operable lever, means for supporting the lever on the outside of the transmission casing, a selector supported outside of said casing, engageable by and disengageable from the lever and connected to operate the high and low speed controller shafts, a reverse selector fixed on the reverse controller shaft outside of the casing, engageable by and disengageable from the lever, and a gate-plate supported from and outside of the transmission casing provided with communicating slots provided with stops to arrest the lever in its neutral position when shifted thereto from its other positions.

3. The combination with variable speed and reverse transmissions for vehicles comprising an enclosing casing, a high speed controller shaft, a low speed controller shaft, and a reverse controller shaft, the shafts being extended to the outside of the casing, of a lever, means for supporting the lever on the outside of the transmission casing, a selector supported outside of the said casing, engageable by and disengageable from the lever and connected to operate the high and low speed controller shafts, a reverse selector fixed on the reverse controller shaft outside of the casing engageable by and disengageable from the lever, the lever being movable transversely of the vehicle into and out of engagement with either of the selectors and operable longitudinally to shift the controller shafts, and a gate-plate supported from and outside of the transmission casing provided with communicating slots provided with stops to arrest the lever in its neutral positon when shifted thereto from its other positions.

4. The combination with variable speed and reverse transmissions for vehicles comprising an enclosing casing, a high speed controller-shaft, a low speed controller shaft and a reverse controller shaft, the shafts being extended to the outside of the casing, of means for supporting the lever on the outside of the transmission casing, a selector pivoted to swing longitudinally and supported outside of said casing, coaxial transversely with the reverse controller shaft, engageable by and disengageable from the lever and connected to operate the high and low speed controller shafts, and a reverse selector fixed on the reverse controller shaft outside of the casing, engageable by and disengageable from the lever, the lever being movable transversely of the vehicle into and out of engagement with either of the selectors and operable longitudinally to shift the controller shafts.

5. The combination with variable speed and reverse transmissions for vehicles comprising an enclosing casing, a high speed controller shaft, a low speed controller shaft, and a reverse controller shaft, the shafts being extended to the outside of the casing, of means for supporting the lever on the outside of the transmission casing, a selector pivoted to swing longitudinally and supported outside of said casing coaxial transversely with the reverse controller shaft, engageable by and disengageable from the lever and connected to operate the high and low speed controller shafts, a reverse selector fixed on the reverse controller shaft outside of the casing, engageable by and disengageable from the lever, the lever being movable transversely of the vehicle into and out of engagement with either of the selectors and operable longitudinally to shift the controller-shafts, and a gate-plate supported from and outside of the transmission casing provided with communicating slots provided with stops to arrest the lever in its neutral position when shifted thereto from its other positions.

6. The combination with variable speed and reverse transmissions for vehicles comprising an enclosing casing, a high speed controller shaft, a low speed controller shaft, and a reverse controller shaft, the shafts being extended to the outside of the casing, of a controller lever, means for supporting the lever on the outside of the transmission casing, a selector supported outside of said casing, engageable by and disengageable from the lever and connected to operate the high and low speed controller shafts, a reverse selector fixed on the reverse controller shaft outside of the casing, engageable by and disengageable from the lever, and a locking plate controlled by the lever to lock the disengaged selectors against longitudinal movement when they are disengaged from the lever.

7. The combination with variable speed and reverse transmissions for vehicles comprising an enclosing casing, a high speed controller shaft, a low speed controller shaft, and a reverse controller shaft, the shafts being extended to the outside of the casing, of a controller lever, means for supporting the lever on the outside of the transmission casing, a selector supported outside of said casing, engageable by and disengageable from the lever and connected to operate the high and low speed controller shafts, a reverse selector fixed on the reverse controller shaft outside of the casing, engageable by and disengageable from the lever, and a locking plate controlled by the lever to lock the disengaged selectors against longitudinal movement when they are disengaged from the lever, said plate being shiftable into position to simultaneously lock both selectors.

8. The combination with variable speed and reverse transmissions for vehicles comprising an enclosing casing, a high speed controller shaft, a low speed controller shaft, and a reverse controller shaft, the shafts being extended to the outside of the casing, of a controller lever, means for supporting the lever on the outside of the transmission casing, a selector supported outside of said casing, engageable by and disengageable from the lever and connected to operate the high and low speed controller shafts, a reverse selector fixed on the reverse controller shaft outside of the casing, engageable by and disengageable from the lever, the lever being movable transversely of the vehicle into and out of engagement with either of the selectors, and operable longitudinally to shift the controller shafts, and a transversely slidable locking plate shifted by the lever to lock the disengaged selector against longitudinal movement.

9. The combination with variable speed and reverse transmissions for vehicles comprising an enclosing casing, a high speed controller shaft, a low speed controller shaft, and a reverse controller shaft, the shafts being extended to the outside of the casing, of a controller lever, means for supporting the lever on the outside of the transmission casing, a selector supported outside of said casing, engageable by and disengageable from the lever and connected to operate the high and lower speed controller shafts, a reverse selector fixed on the reverse controller shaft outside of the casing, engageable by and disengageable from the lever, the lever being movable transversely of the vehicle into and out of engagement with either of the selectors, and operable longitudinally to shift the controller shafts, a locking-plate controlled by the lever to lock the selectors when disengaged from the lever against longitudinal movement, and means attachable to the outside of the transmission casing for supporting the locking plate.

10. The combination with variable speed and reverse transmissions for vehicles comprising an enclosing casing, a high speed controller shaft, a low speed controller shaft, and a reverse controller shaft, the shafts being extended to the outside of the casing, of a foot-operable controller lever, means for supporting the lever on the outside of the transmission casing, a selector supported outside of said casing, engageable by and disengageable from the lever and connected to operate the high and low speed controller shafts, a reverse selector fixed on the reverse controller shaft outside of the casing, engageable by and disengageable from the lever, the lever being movable transversely of the vehicle into and out of engagement with either of the selectors, and operable longitudinally to shift the controller shafts, a locking plate controlled by the lever to lock the selectors when disengaged therefrom against longitudinal movement, and spring means to transversely retract the locking plate.

11. The combination with variable speed and reverse transmissions for vehicles comprising an enclosing casing, a high speed controller shaft, a low speed controller shaft, and a reverse controller shaft, the shafts being extended to the outside of the casing, a lever, means for supporting the lever on the outside of the transmission casing, a selector supported outside of said casing, engageable by and disengageable from the lever and connected to operate the high and the low speed controller shafts, a reverse selector fixed on the reverse controller shaft outside of the casing, engageable by and disengageable from the lever said lever being movable transversely of the vehicle into and out of engagement with either of the selectors and operable longitudinally to shift the controller shafts, said lever being further engageable with both selectors to hold the selectors in neutral positions and a gate-plate provided with means whereby it may be attached to the outside and at one side of the transmission casing and with longitudinal and transverse guide-slots for the lever.

12. The combination with variable speed and reverse transmissions for vehicles comprising an enclosing casing, a high speed controller shaft, a low speed controller shaft, and a reverse controller shaft, the shafts being extended to the outside of the casing, a lever, means for supporting the lever on the outside of the transmission casing, a selector supported outside of said casing, engageable by and disengageable from the lever and connected to operate the high and low speed controller shafts, a reverse selector fixed on the reverse controller shaft outside of the casing, engageable by and disengageable from the lever, and a gate-plate provided with means whereby it may be attached to the outside and at one side of the transmission casing, with means for connection to a sill of the vehicle frame, and with guide-slots for the lever.

13. The combination with variable speed and reverse transmissions for vehicles comprising an enclosing casing, a high speed controller shaft, a low speed controller shaft, and a reverse controller shaft, the shafts being extended to the outside of the casing, of a controller lever, means for supporting the lever on the outside of the transmission casing, a selector supported outside of said casing, engageable by and disengageable from the lever and connected to operate the high and low speed controller shafts, a reverse selector fixed on the reverse controller shaft outside of the casing engageable by and disengageable from the lever, the lever being movable transversely of the vehicle into and out of engagement with either of the selectors and operable longitudinally to shift the controller shafts, a gate-plate supported from and at one side of the transmission casing, and a locking-plate operated by the lever, transversely slidable under and mounted on the gate-plate and provided with means for locking the selectors when disengaged from the lever.

14. The combination with variable speed and reverse transmissions for vehicles comprising an enclosing casing, a high speed controller shaft, a low speed controller shaft, and a reverse controller shaft, the shafts being extended to the outside of the casing, of a foot-operable controller lever, means for supporting the lever on the outside of the transmission casing, a selector supported outside of said casing, engageable by and disengageable from the lever and connected to operate the high and low speed controller shafts, a reverse selector fixed on the reverse controller shaft outside of the casing engageable by and disengageable from the lever, the lever being movable transversely of the vehicle into and out of engagement with either of the selectors and operable longitudinally to shift the controller shafts, a gate-plate supported from and outside of the transmission-casing, provided with communicating slots provided with abutments to arrest the lever in its longitudinal movement from one of its positions to another, and a locking-plate operable by the lever, transversely slidable under and mounted on the gate-plate and provided with means for locking the selectors when disengaged from the lever.

15. The combination with variable speed and reverse transmissions for vehicles comprising an enclosing casing, a high speed controller shaft, a low speed controller shaft, and a reverse controller shaft, the shafts being extended to the outside of the casing, of a controller lever, means for supporting the lever on the outside of the transmission casing, a selector supported outside of said casing, engageable by and disengageable from the lever and connected to operate the high and low speed controller shafts, a reverse selector fixed on the reverse controller shaft outside of the casing engageable by and disengageable from the lever, the lever being movable transversely of the vehicle into and out of engagement with either of the selectors and operable longitudinally to shift the controller shafts, a gate-plate supported from and outside of the transmission casing provided with communicating slots provided with abutments to arrest the lever in its longitudinal movement from one of its positions to another, a locking plate provided with means for locking the selectors when disengaged from the lever, and cross-rods under and secured to the gate-plate, on which the locking-plate is transversely slidable.

16. The combination with variable speed and reverse transmission for vehicles comprising an enclosing casing, a high speed controller shaft, a low speed controller shaft, and a reverse controller shaft, the shafts being extended to the outside of the casing, the combination of a controller lever, means for supporting the lever on the outside of the transmission casing, a selector supported outside of said casing, engageable by and disengageable from the lever and connected to operate the high and low speed controller shafts, a reverse selector fixed on the reverse controller shaft outside of the casing engageable by and disengageable from the lever, the lever being movable transversely of the vehicle into and out of engagement with either of the selectors and operable longitudinally to shift the controller shafts, a gate-plate supported from and outside of the transmission-casing, provided with communicating slots provided with abutments to arrest the lever in its longitudinal movement from one of its positions to another, a locking-plate provided with means for locking the selector levers when disengaged from the lever, cross-rods secured to and under the gate-plate, on which the locking-plate is transversely slidable, and springs on the rods for retracting the locking plate.

17. The combination with variable speed and reverse transmissions for vehicles comprising an enclosing casing, a high speed controller shaft, a low speed controller shaft and a reverse controller shaft, of a controller lever, a lever-support adapted to be attached to the outside of the transmission casing, a selector mounted on said support outside of said casing, engageable by and disengageable from the lever and connected to operate the high and low speed controller shafts, and a reverse selector fixed on the reverse controller shaft outside of the casing, the lever being pivoted to swing transversely of the vehicle into engagement with either of the selectors and operable longitudinally to impart the desired shift to the controller shafts said lever being arranged for simultaneously engaging both selectors for locking the selectors in neutral positions.

18. The combination with variable speed and reverse transmissions for vehicles comprising an enclosing casing, a high speed controller shaft, a low speed controller shaft and a reverse controller shaft, of a controller lever, a lever-support adapted to be secured to the outside of the transmission casing, a selector mounted on said support outside of said casing, engageable by and disengageable from the lever and connected to operate the high and low speed controller shafts, a reverse selector fixed on the reverse controller shaft outside of the casing, the lever being movable transversely of the vehicle into engagement with either of the selectors and operable longitudinally to impart the desired shift to the controller shafts said lever being arranged for simultaneously engaging both selectors for locking the selectors in neutral positions, a gate-plate provided with transverse and longitudinal guide slots for the lever, and means for attaching the gate-plate to the outside of the casing.

19. The combination with variable speed and reverse transmissions for vehicles comprising an enclosing casing, a high speed controller shaft, a low speed controller shaft and a reverse controller shaft, of a controller lever, a lever-support adapted to be secured to the outside of the transmission casing a selector mounted on said support outside of said casing, engageable by and disengageable from the lever and connected to operate the high and low speed controller shafts, a reverse selector fixed on the reverse controller shaft outside of the casing, the lever being movable transversely of the vehicle into engagement with either of the selectors and operable longitudinally to impart the desired shift to the controller shafts, a gate-plate provided with slots for the lever, and means for attaching the gate-plate to the outside of the casing and also to one of the sills of the frame of the vehicle.

20. The combination with variable speed and reverse transmissions for vehicles comprising an enclosing casing, a high speed controller shaft, a low speed controller shaft, and a reverse controller shaft, of a controller-lever, a lever-support adapted to be secured to the outside of the transmission casing, a selector mounted on said support outside of said casing, engageable by and disengageable from the lever and connected to operate the high and low speed controller shafts, a reverse selector fixed on the reverse controller shaft outside of the casing, the lever being movable transversely of the vehicle into engagement with either of the selectors and operable longitudinally to impart the desired shift to the controller shafts, a gate-plate provided with slots for the lever, means for attaching the gate-plate to the outside of the casing, and a clamp for attaching the gate-plate to one of the sills of the vehicle frame.

21. The combination with variable speed and reverse transmissions for vehicles comprising an enclosing casing, a high speed controller shaft, a low speed controller shaft and a reverse controller shaft, of a controller lever, a lever-support adapted to be secured to the outside of the transmission casing, a selector mounted on said support outside of said casing, engageable by and disengageable from the lever and connected to operate the high and low speed controller shafts, a reverse selector fixed on the reverse controller shaft outside of the casing, the lever being movable transversely of the vehicle into engagement with either of the selectors and operable longitudinally to impart the desired shift to the controller shafts, a gate-plate provided with slots for the lever, means for attaching the gate-plate to the outside of the transmission casing, and to one of the frame-sills of the vehicle, and interfitting positioning means between the lever-support and the gate-plate.

22. The combination with variable speed and reverse transmissions for vehicles comprising an enclosing casing, a high speed controller shaft, a low speed controller shaft and a reverse controller shaft, of a controller lever, a lever-support adapted to be secured to the outside of the transmission casing, a selector mounted on said support outside of said casing, engageable by and disengageable from the lever and connected to operate the high and low speed controller shafts, a reverse selector fixed on the reverse controller shaft outside of the casing, the lever being movable transversely of the vehicle into engagement with either of the selectors, and operable longitudinally to impart the desired shift to the controller shafts, a gate-plate provided with slots for the lever, means for attaching the gate-plate to the outside of the transmission casing, and to one of the frame-sills of the vehicle, and a grooved member on the lever-support, the gate-plate being provided with means to enter the grooved member to co-relatively position the gate-plate and the support.

23. The combination with variable speed and reverse transmissions for vehicles comprising an enclosing casing, a high speed controller shaft, a low speed controller shaft and a reverse controller shaft, of a controller lever, a lever-support adapted to be secured to the outside of the transmission casing, a selector mounted on said support outside of said casing engageable by and disengageable from the lever and connected to operate the high and low speed controller shafts, a reverse selector fixed on the reverse controller shaft outside of the casing, the lever being movable transversely of the vehicle into engagement with either of the selectors and operable longitudinally to impart the desired shift to the controller shafts, and means in said support to conduct lubricant from the transmission casing to the lever.

24. The combination with variable speed and reverse transmissions for vehicles comprising an enclosing casing, a high speed controller shaft, a low speed controller shaft and a reverse controller shaft, of a controller lever, a lever-support adapted to be secured to the outside of the transmission casing, a selector outside of said casing, engageable by and disengageable from the lever and connected to operate the high and low speed controller shafts, a reverse selector fixed on the reverse controller shaft outside of the casing, the lever being movable transversely of the vehicle into engagement with either of the selectors and operable longitudinally to impart the desired shift to the controller shafts, said lever being arranged for simultaneously engaging both selectors for locking the selectors in neutral positions, and bearing members in which the lever is pivoted to swing universally, carried by said support.

25. The combination with variable speed and reverse transmissions for vehicles comprising an enclosing casing, a high speed controller shaft, a low speed controller shaft and a reverse controller shaft, of a controller lever, a lever-support adapted to be secured to the outside of the transmission casing, a selector outside of said casing, engageable by and disengageable from the lever and connected to operate the high and low speed controller shafts, a reverse selector fixed on the reverse controller shaft outside of the casing, the lever being movable transversely of the vehicle into engagement with either of the selectors and operable longitudinally to impart the desired shift to the controller shafts, and bearing members for the lever carried by said support, one of which is adjustable from the outside of the support.

26. The combination with variable speed and reverse transmissions for vehicles comprising an enclosing casing, a high speed controller shaft, a low speed controller shaft and a reverse controller shaft, of a controller lever, a lever-support comprising a ring adapted to be secured to the outside of the transmission casing upon removal of a cover-plate therefrom and provided with a lever-bearing, and selectors, one of which is pivoted on said lever-support and engageable by and disengageable from the lever and operatively connected to said shafts respectively.

27. The combination with variable speed and reverse transmissions for vehicles comprising an enclosing casing, a high speed controller shaft, a low speed controller shaft and a reverse controller shaft, of a controller-lever, a lever support comprising a ring adapted to be secured to the outside of the transmission casing upon removal of a cover-plate therefrom, provided with a lever bearing and means for delivering lubricant from the transmission-casing to the lever bearing, and selectors, one of which is pivoted on said support and engageable by and disengageable from the lever and operatively connected to said shafts respectively.

28. The combination with variable speed and reverse transmissions for vehicles comprising an enclosing casing, a high speed controller shaft, a low speed controller shaft and a reverse controller shaft, of a foot-operable lever, a lever support comprising a ring adapted to be secured to the outside of the transmission casing upon removal of a cover-plate therefrom and provided with a lever bearing, selectors, one of which is pivoted on said support and engageable by and disengageable from the lever and operatively connected to said shafts respectively, and a cap secured to and to close one side of the ring.

29. The combination with variable speed and reverse transmissions for vehicles comprising an enclosing casing, a high speed controller shaft, a low speed controller shaft and a reverse controller shaft, of a foot-operable controller lever, a lever support comprising a ring adapted to be secured to the outside of the transmission casing upon removal of a cover-plate therefrom and provided with a lever-bearing, and means for delivering lubricant from the transmission-casing to the bearing, selectors, one of which is pivoted on said pedal support and engageable by and disengageable from the lever and operatively connected to said shafts respectively, and a cap secured to one side of the ring.

30. The combination with variable speed and reverse transmissions for vehicles comprising an enclosing casing, a high speed controller shaft, a low speed controller shaft and a reverse controller shaft, of a controller lever, a lever-support comprising a ring adapted to be secured to the outside of the transmission casing, a selector mounted on said support outside of said casing, engageable by and disengageable from the lever and connected to operate the high and low speed controller shafts, a reverse selector fixed on the reverse controller shaft outside of the casing, the lever being movable transversely of the vehicle into engagement with either of the selector levers and operable longitudinally to impart the desired shift to the controller-shafts, and a gate-plate having slots to direct the lever movements, and provided with means whereby it may be attached to the outside of the transmission casing.

31. The combination with variable speed and reverse transmissions for vehicles comprising an enclosing casing, a high speed controller shaft, a low speed controller shaft and a reverse controller shaft, of a controller lever, a lever support comprising a ring adapted to be secured to the outside of the transmission casing, a selector mounted on said support outside of said casing, engageable by and disengageable from the lever and connected to operate the high and low speed controller shafts, a reverse selector fixed on the reverse controller shaft outside of the casing, the lever being movable transversely of the vehicle into engagement with either of the selector levers and operable longitudinally to impart the desired shift to the controller shafts, and a gate-plate having slots to direct the lever movements and provided with means whereby it may be secured to the outside of the transmission casing and to the frame of the vehicle.

32. The combination with variable speed and reverse transmissions for vehicles comprising an enclosing casing, a high speed controller shaft, a low speed controller shaft and a reverse controller shaft, of a controller lever, a lever support adapted to be secured to the outside of the transmission casing, a selector mounted on said support outside of said casing, engageable by and disengageable from the lever and connected to operate the high and low speed controller shafts, a reverse selector fixed on the reverse controller shaft outside of the casing, the lever being pivoted to swing transversely of the vehicle into engagement with either of the selector levers and operable longitudinally to impart the desired shift to the controller shafts said lever being arranged for simultaneously engaging both selectors for locking the selectors in neutral positions, and spring-means for transversely retracting the lever mounted on pivotal members carried by the support.

33. The combination with variable speed and reverse transmissions for vehicles comprising an enclosing casing, a high speed controller shaft, a low speed controller shaft and a reverse controller shaft, said shafts being extended to the outside of the casing, of a controller-lever, means for supporting the lever on the outside of the transmission casing, a selector supported outside of the casing, engageable by and disengageable from the lever, a lever on the low speed controller shaft connected to operate the high speed controller shaft, a yielding connection between said selector and the lever on the low speed controller shaft, and a reverse selector fixed on the controller-shaft outside of the casing, the controller lever being movable transversely of the vehicle into and out of engagement with either of the selectors and operable longitudinally to impart the desired shift to the controller-shafts.

34. The combination with variable speed and reverse transmissions for vehicles comprising an enclosing casing, a high speed controller shaft, a low speed controller shaft and a reverse controller shaft, said shafts being extended to the outside of the casing, of a controller lever, means for supporting the lever on the outside of the transmission casing, a selector supported outside of the casing, engageable by and disengageable from the lever, a lever on the low speed controller shaft connected to operate the high speed controller shaft, a universal yielding connection between said selector and the lever on the low speed controller shaft, and a reverse selector lever fixed on the controller shaft outside of the casing, the controller lever being movable transversely of the vehicle into and out of engagement with either of the selectors and operable longitudinally to impart the desired shift to the controller shafts.

35. The combination with variable speed and reverse transmissions for vehicles comprising an enclosing casing, a high speed controller shaft, a low speed controller shaft and a reverse controller shaft, said shafts being extended to the outside of the casing, the combination of a controller lever, means for supporting the lever on the outside of the transmission casing, a selector supported outside of the casing engageable by and disengageable from the lever, a lever on the low speed controller shaft connected to operate the high speed controller shaft, a yielding connection between said selector and the lever on the low speed controller shaft comprising a sleeve and a spring therein, and a reverse selector lever fixed on the controller shaft outside of the casing, the controller lever being movable transversely of the vehicle into and out of engagement with either of the selector levers and operable longitudinally to impart the desired shift to the controller shafts.

36. The combination with variable speed and reverse transmissions for vehicles comprising an enclosing casing, a high speed controller shaft, a low speed controller shaft and a reverse controller shaft, said shafts being extended to the outside of the casing, of a controller lever, means for supporting the lever on the outside of the transmission casing, a selector supported outside of the casing, engageable by and disengageable from the lever, a lever on the low speed controller shaft connected to operate the high speed controller shaft, an adjustable arm on said selector, a connection between said selector and the lever on the low speed controller shaft, and a reverse selector lever fixed on the controller shaft outside of the casing, the lever being movable transversely of the vehicle into and out of engagement with either of the selector levers and operable longitudinally to impart the desired shift to the controller shaft.

37. The combination with variable speed and reverse transmissions for vehicles comprising an enclosing casing, a high speed controller shaft, a low speed controller shaft, and a reverse controller shaft, the shafts being extended to the outside of the casing, the combination of a controller lever, means for supporting the lever on the outside of the transmission casing, a selector supported outside of said casing, engageable by and disengageable from the lever and connected to operate the high and low speed controller shafts, a reverse selector fixed on the reverse controller shaft outside of the casing engageable by and disengageable from the lever, the lever being movable transversely of the vehicle into and out of engagement with either of the selectors and operable longitudinally to impart the desired shift to the controller shafts, a gate-plate provided with means whereby it may be secured to the outside of the transmission casing and with slots for directing the lever movements, and a locking-plate supported by and transversely slidable under the gate-plate, spring means for holding the locking-plate in a medial position, the locking plate being provided with a longitudinal slot through which the controller lever extends to control the movement of the locking plate.

38. The combination with variable speed and reverse transmissions for vehicles comprising an enclosing casing, a high speed controller shaft, a low speed controller shaft, and a reverse controller shaft, the shafts being extended to the outside of the casing, of a controller lever, means for supporting the lever on the outside of the transmission casing, a selector supported outside of said casing, engageable by and disengageable from the lever and connected to operate the high and low speed controller shafts, a reverse selector fixed on the reverse controller shaft outside of the casing engageable by and disengageable from the lever, the lever being movable transversely of the vehicle into and out of engagement with either of the selectors and operable longitudinally to impart the desired shift to the controller shafts, and a gate-plate formed of sheet metal provided with longitudinal and cross-slots for directing the lever movements, with laterally extending and depending brackets adapted to be secured to the transmission casing.

39. The combination with variable speed and reverse transmissions for vehicles comprising an enclosing casing, a high speed controller shaft, a low speed controller shaft, and a reverse controller shaft, the shafts being extended to the outside of the casing, of a controller lever, means for supporting the lever on the outside of the transmission casing, a selector supported outside of said casing, engageable by and disengageable from the lever and connected to operate the high and low speed controller shafts, a reverse selector fixed on the reverse controller shaft outside of the casing engageable by and disengageable from the lever, the lever being movable transversely of the vehicle into and out of engagement with either of the selectors and operable longitudinally to impart the desired shift to the controller shafts, and a gate-plate formed of sheet metal, provided with longitudinal and cross slots for directing the lever movements, with brackets at one side and with a flange at its front end adapted to be secured to the outside of the transmission casing.

40. The combination with variable speed and reverse transmissions for vehicles comprising an enclosing casing, a high speed controller shaft, a low speed controller shaft, and a reverse controller shaft, the shafts being extended to the outside of the casing, of a controller lever, means for supporting the lever on the outside of the transmission casing, a selector supported outside of said casing, engageable by and disengageable from the lever and connected to operate the high and low speed controller shafts, a reverse selector fixed on the reverse controller shaft outside of the casing engageable by and disengageable from the lever, the lever being movable transversely of the vehicle into and out of engagement with either of the selectors and operable longitudinally to impart the desired shift to the controller shafts, and a gate-plate formed of sheet metal provided with longitudinal and cross slots for directing the lever movements, with a flange at one side having secured thereto a block adapted to be secured to a sill of the vehicle frame.

41. The combination with variable speed and reverse transmissions for vehicles comprising an enclosing casing, a high speed controller shaft, a low speed controller shaft, and a reverse controller shaft, the shafts being extended to the outside of the casing, of a foot-operable lever, means for supporting the lever on the outside of the transmission casing, a selector supported outside of said casing, engageable by and disengageable from the lever and connected to operate the high and low speed controller shafts, a reverse selector fixed on the reverse controller shaft outside of the casing engageable by and disengageable from the lever, the lever being movable transversely of the vehicle into and out of engagement with either of the selectors and operable longitudinally to impart the desired shift to the controller shafts, and a gate-plate formed of sheet metal provided with means whereby it may be secured to the outside of the transmission casing and with longitudinal and cross slots for directing the lever movements and with a gusset to reinforce the plate between the longitudinal slots.

Signed at Chicago, Illinois, this 23rd day of July, 1925.

AAGE E. WINCKLER.